United States Patent [19]

McNeil

[11] Patent Number: 5,555,482
[45] Date of Patent: Sep. 10, 1996

[54] ETCHED ERASE BAND FEATURE FOR THIN FILM RECORDING HEADS

[75] Inventor: Michael McNeil, Boulder, Colo.

[73] Assignee: Maxtor Corporation, Longmont, Colo.

[21] Appl. No.: 272,113

[22] Filed: Jul. 7, 1994

[51] Int. Cl.⁶ .......................... G11B 5/187; G11B 5/127; G11B 5/23
[52] U.S. Cl. .......................... 360/125; 360/119; 360/122
[58] Field of Search .................................. 360/125, 122, 360/115, 119, 110, 118, 127, 57, 66

[56] References Cited

U.S. PATENT DOCUMENTS

| 3,882,544 | 5/1975 | Hughes | 360/118 |
| 4,970,616 | 11/1990 | Ramaswamy | 360/122 |
| 4,984,118 | 1/1991 | Springer | 360/125 |
| 5,227,939 | 7/1993 | Gooch | 360/115 |
| 5,267,112 | 11/1993 | Batra et al. | 360/119 |
| 5,315,469 | 5/1994 | McNeil | 360/119 |

FOREIGN PATENT DOCUMENTS

| 56-19513 | 2/1981 | Japan | 360/122 |
| 62-165717 | 7/1987 | Japan | 360/122 |
| 63-304413 | 12/1988 | Japan | 360/122 |
| 1159816 | 6/1989 | Japan | 360/122 |

Primary Examiner—Stuart S. Levy
Assistant Examiner—William J. Klimowicz
Attorney, Agent, or Firm—Sheridan Ross and McIntosh

[57] ABSTRACT

A magnetic head that creates erase bands on the outer edges of a track. The magnetic head has a trailing edge pole that is separated from a leading edge pole by a gap. The leading edge pole has a width that is less than the width of a center section of the trailing edge pole. The thinner leading edge pole creates a saturation of the magnetic field at the outer edges of the leading pole. Saturation at the outer edges of the leading pole prevents a full magnetization of the disk along the outer edges of the track. The poorly magnetized outer track portions will not generate a significant amount of noise in a head located above an adjacent track. The saturated outer leading pole edges in effect create an erase band along the outer edges of the track.

18 Claims, 2 Drawing Sheets

ETCHED ERASE BAND FEATURE FOR THIN FILM RECORDING HEADS

BACKGROUND OF THE INVENTION

1. Field of the Invention

The present invention relates to the magnetic head of a hard disk drive.

2. Description of Related Art

Hard disk drives contain at least one magnetic disk that rotates relative to a plurality of magnetic heads. There is typically one head for each disk surface. The magnetic heads are constructed to magnetize and sense the magnetic field of the disk. FIG. 1 shows a conventional magnetic head that has two magnetic poles separated by a gap. A magnetic flux flows between the poles and across the gap. Part of the flux flows into the disk and magnetizes a portion of the disk. When reading information the head senses the magnetized area of the disk.

As shown in FIG. 2, a hard disk drive stores information within tracks of the disk. Each track contains a plurality of magnetized areas that extend across the track. It has been found that because of edge effects, existing magnetic heads will create a magnetized area of the disk that slopes away from the leading edge portion of the head and creates a curve at the outer edges of the track. Overlapping magnetized edge portions of adjacent tracks generate noise and even appear as a transition to a head reading information from an adjacent track. The presence of noise can create an improper reading of information from the disk, particularly if the head is not on the center of the track. Additionally, noise can undermine a servo routine that maintains the head on the center of the track. It would be desirable to provide a magnetic head that reduces the edge effects produced by magnetic heads in the prior art.

SUMMARY OF THE INVENTION

The present invention is a magnetic head with ion milled pole geometries that produce saturation of the outer edges of the leading pole which are useful in creating erase bands on the outer edges of a track. The magnetic head has a trailing edge pole that is separated from a leading edge pole by a gap. The poles are coupled to a coil which generates a magnetic field that flows across the gap and into a disk to magnetize the same. The leading edge pole has a width that is less than the width of a center section of the trailing edge pole. The thinner leading edge pole creates a saturation of the magnetic field at the outer edges of the leading pole, which prevents a full magnetization of the disk along the outer edges of the track. The poorly magnetized outer track portions resulting from the saturated outer edges of the leading pole will in effect create an erase band along the outer edges of the track and therefore not generate a significant amount of noise in a head located above an adjacent track.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
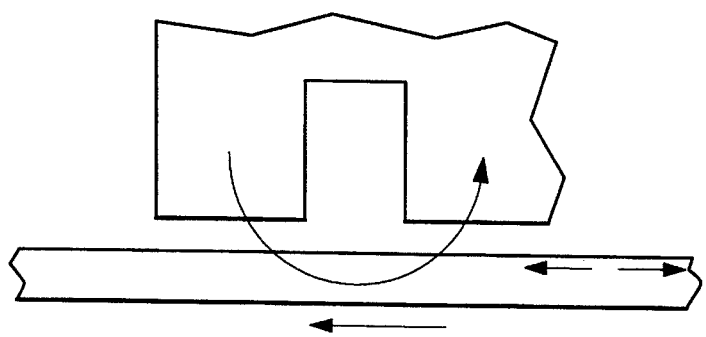
FIG. 1 is a side view of a magnetic head in the prior art.
Figure 2:
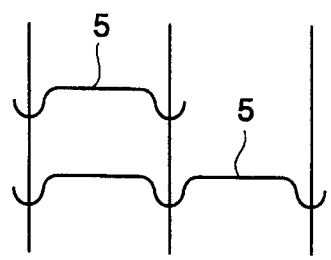
FIG. 2 is a top view showing the write field and magnetized areas of adjacent tracks on a disk in the prior art.
Figure 3:
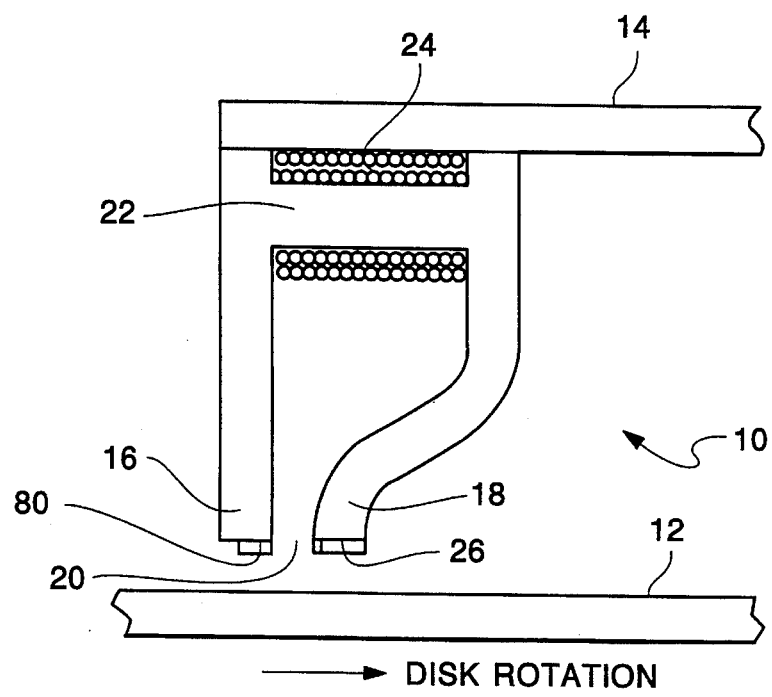
FIG. 3 is a side view of a magnetic head of the present invention.

Referring to the drawings more particularly by reference numbers, FIG. 3 shows a magnetic head 10 of the present invention. The head 10 is located adjacent to a disk 12. The head 10 is used to write and read information by magnetizing and sensing the magnetic field of the disk 12. The information is typically stored on annular tracks of the disk. The head 10 is mounted to an actuator arm 14 which suspends the head 10 above the disk surface. The head 10 may or may not have a slider portion that creates an air bearing between the head and the disk surface. The actuator arm 14 typically has a voice coil motor (not shown) that moves the head from track to track.

The head 10 has a leading edge pole 16 separated from a trailing edge pole 18 by a gap 20. The poles 16 and 18 extend from a magnetic core 22. Coupled to the core 22 is a coil 24. The coil 24 is coupled to a source of current (not shown). Providing a current to the coil 24 generates a magnetic field that flows between the leading 16 and trailing 18 edge poles and across the gap 20. Part of the magnetic field flows into the disk 12 to magnetize the same.

The head 10 is typically constructed with conventional thin film techniques. The pole faces 80 and 26 of poles 16 and 18, respectively, are shaped by removing portions of the bottom edge of the core 22. The bottom core portions can be removed by etching, ion milling or any other means for creating the pole faces 80 and 26. In the preferred embodiment, the pole faces 80 and 26 protrude 1–3 micrometers from the end of poles 16 and 18 and lie in a plane substantially perpendicular to a plane that is parallel to the plane of the disk 12.

Figure 4:
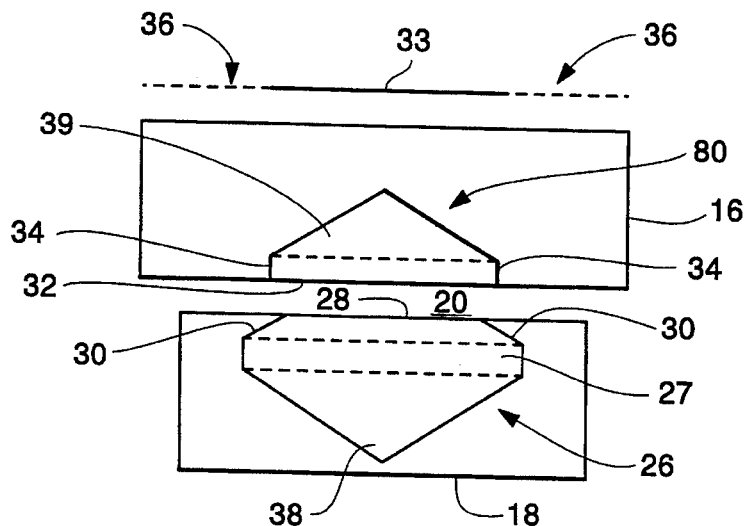
FIG. 4 is a top view showing the poles of the magnetic head magnetizing a track of a disk.

As shown in FIG. 4, the trailing edge pole face 26 has a center section 27 and a gap edge 28 that is adjacent to the gap 20. The center section 27 and gap edge 28 are joined by a pair of straight oblique lines 30. The leading edge pole face 80 also has a gap edge 32 adjacent to the gap 20. The width of the gap edge 32 of the leading edge pole face 80 is less than the width of the center section 27 of the trailing edge pole face 26.

When the coil 24 of the head 10 is energized, a magnetic field flows across the gap 20 between pole faces 26 and 80. The magnetic field also magnetizes a portion of the disk indicated by line 33 of FIG. 4. The thin gap edge 32 of the leading edge pole face 80 causes the magnetic field to saturate at the outer portions 34 of the pole face 80. Saturating the outer portions 34 prevents the outer edges of the track from being fully magnetized. As shown in FIG. 4, the under magnetized areas create erase bands 36 along the outer edges of the track. The magnetic field of the erase bands 36 has a relatively low strength, such that the erase bands will not generate a significant amount of noise in a head located on an adjacent track.

In the preferred embodiment, the gap edge 28 of the trailing edge pole face 26 has a width that is approximately equal to the width of the leading edge pole face gap edge 32.

The equal width can insure proper saturation of the outer leading edge pole face portions 34. Both the trailing edge pole face 26 and the leading edge pole face 80 may have triangular shaped portions 38 and 39, respectively, located opposite from the gap edges 28 and 32. The triangular shaped ends 38 and 39 of the pole faces 26 and 80 reduce the edge effects of the head and "undershoots" of the readback isolated pulse.

Figure 5:
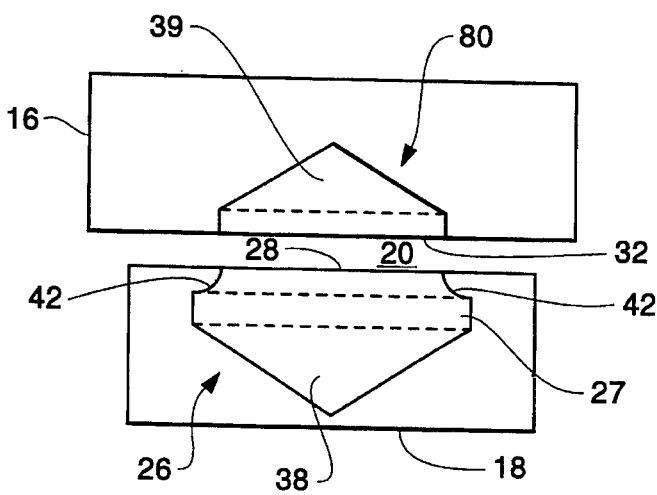
FIG. 5 is a top view similar to FIG. 4 showing an alternate magnetic head embodiment.
Figure 6:
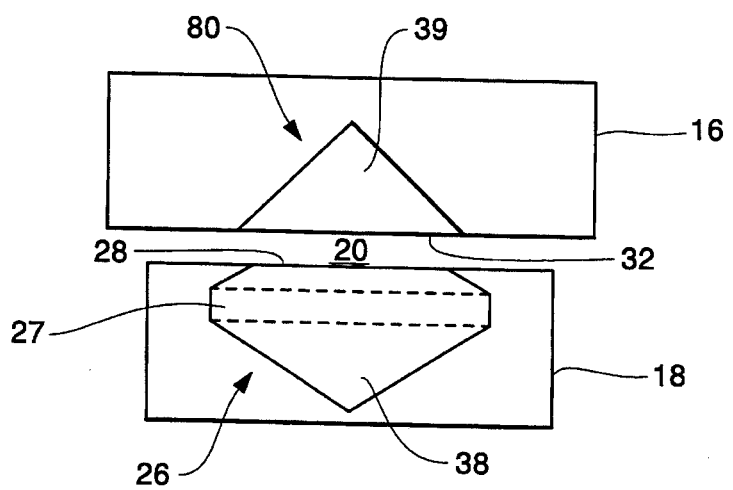
FIG. 6 is a top view similar to FIG. 4 showing an alternate magnetic head embodiment.

As shown in FIG. 5, the trailing edge pole face 26 may have radially shaped portions 42 that adjoin the center section 27 and the gap edge 28. FIG. 6 shows another alternate embodiment, wherein the leading edge pole face 80 is shaped as an equilateral triangle.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A magnetic head for writing data to a track on a surface of a magnetic disk in a hard disk drive, comprising:

(a) a leading edge pole that has a leading edge pole face;

wherein said leading edge pole face has a shape defined by a leading gap edge, a first leading outer edge, a second leading outer edge, a first leading front edge, and a second leading front edge;

wherein said leading gap edge extends from a first leading gap edge end to a second leading gap edge end;

wherein said first leading outer edge extends substantially perpendicular to said leading gap edge and from said first leading gap edge end to a first leading outer edge end;

wherein said second leading outer edge extends substantially perpendicular to said leading gap edge and from said second leading gap edge end to a second leading outer edge end;

wherein said first leading gap edge end, said second leading gap edge end, said first leading outer edge end, and said second leading outer edge end define a leading rectangle;

wherein said first leading front edge extends from said first leading outer edge end to a leading front point;

wherein said second leading front edge extends from said second leading outer edge end to said leading front point;

wherein said leading front point is located between substantially parallel lines that include said first and second leading outer edges;

wherein said first leading outer edge end, said second leading outer edge end, and said leading front point define a leading triangle;

(b) a trailing edge pole that has a trailing edge pole face;

wherein said trailing edge pole face has a shape defined by a trailing gap edge, a first trailing front edge, a second trailing front edge, a first trailing outer edge, a second trailing outer edge, a first trailing back edge, and a second trailing back edge;

wherein said trailing gap edge extends from a first trailing gap edge end to a second trailing gap edge end;

wherein said first trailing front edge extends from said first trailing gap edge end to a first trailing front edge end;

wherein said second trailing front edge extends from said second trailing gap edge end to a second trailing front edge end;

wherein said first trailing gap edge end, said second trailing gap edge end, said first trailing front edge end, and said second trailing front edge end define a trapezoid in which said first and second trailing front edges are non-parallel and of substantially equal length;

wherein said first trailing outer edge extends from said first trailing front edge end to a first trailing outer edge end;

wherein said second trailing outer edge extends from said second trailing front edge end to a second trailing outer edge end;

wherein said first trailing front edge end, said second trailing front edge end, said first trailing outer edge end, and said second trailing outer edge end define a center section with a trailing rectangular shape;

wherein said first trailing back edge extends from said first trailing outer edge end to a trailing back point;

wherein said second trailing back edge extends from said second trailing outer edge end to said trailing back point;

wherein said trailing back point is located between parallel lines that include said first and second trailing outer edges;

wherein said first trailing outer edge end, said second trailing outer edge end, and said trailing back point define a trailing triangle;

wherein said leading gap edge is separated from said trailing gap edge by a gap;

wherein said leading gap edge is substantially parallel to said trailing gap edge;

wherein said leading gap edge is substantially the same length as said trailing gap edge;

wherein said first leading gap edge end, said second leading gap edge end, said first trailing gap edge end, and said second trailing gap edge end define a gap rectangle;

wherein the width of said leading gap edge, defined by said first and second leading gap edge ends, is less than the width of said center section, defined by said first and second trailing outer edge ends;

(c) a coil, coupled to said leading and trailing edge poles, for generating a magnetic field that flows across said gap between said leading and trailing edge pole faces such that portions of said leading edge pole face adjacent to said first and second leading outer edges are magnetically saturated for creating erase bands on the outer edges of the track of the magnetic disk.

2. The magnetic head as recited in claim 1, wherein said first leading gap edge end is coincident with said first leading outer edge end, and said second leading gap edge end is coincident with said second leading outer edge end, so that said leading edge pole face has a triangle shape.

3. The magnetic head as recited in claim 2, wherein:

said triangle is substantially an equilateral triangle.

4. The magnetic head as recited in claim 1, wherein at least one of said trailing edge pole face and said leading edge pole face is ion milled.

5. The magnetic head as recited in claim 1, wherein at least one of said leading edge pole face and said trailing edge pole face is elevated above a core plane that is substantially parallel to said leading or trailing edge pole face, and a wall extends between the edges defining the face and the core plane, wherein said wall is substantially perpendicular to the face and the core plane.

6. The magnetic head as recited in claim 1, wherein at least one of said first and second trailing front edges is replaced with a radial line.

7. The magnetic head as recited in claim 1, wherein said leading and trailing edge pole faces are raised above a core.

8. The magnetic head as recited in claim 1, wherein:

said trailing edge pole includes an ion milled portion defining said trailing edge pole face and said leading edge pole includes an ion milled portion defining said leading edge pole face.

9. The magnetic head as recited in claim 1, wherein:

said first and second trailing front edges are both replaced with radial edges.

10. The magnetic head as recited in claim 1, wherein:

said leading edge pole and said trailing edge pole are made from the same material.

11. The magnetic head as recited in claim 1, wherein:

said leading edge pole and said trailing edge pole are a single piece of material.

12. The magnetic head as recited in claim 1, wherein:

said coil is wound around an axis that is substantially parallel to the track bearing surface of the disk.

13. The magnetic head as recited in claim 1, wherein:

said coil is wound around a core portion centrally located between said leading and trailing edge poles, said core portion being approximately equidistant from said leading and trailing edge pole faces.

14. A magnetic head for writing data to a track of a magnetic disk in a hard disk drive, comprising:

a trailing edge pole having a trailing edge pole face with a shape defined by a trapezoid, a rectangular center section of a predetermined width, and a first triangle, wherein said rectangular center section is located between and shares opposite sides with said trapezoid and said first triangle, wherein said trapezoid has a first parallel side adjacent to a gap, a second parallel side that is parallel to and longer than said first parallel side, and two non-parallel sides of substantially equal length;

a leading edge pole having a leading edge pole face that is separated from said trailing edge pole face by said gap, said leading edge pole face having a shape defined by a second rectangle and a second triangle, wherein said second rectangle has a gap edge adjacent to said gap and shares an opposite side with said second triangle, said gap edge of said leading edge pole face further having a predetermined width that is less than said width of said rectangular center section of said trailing edge pole face, said leading edge pole face also having outer edge portions adjacent to ends of said gap edge; and a coil coupled to said leading and trailing edge poles, said coil generating a magnetic field that flows across said gap between said leading and trailing edge pole faces such that said outer edge portions of said leading edge pole face are magnetically saturated for creating erase bands on the outer edges of said track of said magnetic disk.

15. The magnetic head as recited in claim 14, wherein:

at least one of said leading edge pole face and said trailing edge pole face is ion milled.

16. The magnetic head as recited in claim 14, wherein:

said trailing edge pole face has a shape entirely defined by straight lines.

17. The magnetic head as recited in claim 14, wherein:

at least one of said leading edge pole face and said trailing edge pole face is the top of a mesa like structure disposed on a core plane that is substantially parallel to the at least one of said leading and trailing edge pole faces.

18. A method of creating erase bands on a magnetic disk with a magnetic head, comprising the steps of:

a) providing a magnetic head having a trailing edge pole separated from a leading edge pole by a gap;

wherein said trailing edge pole has an ion milled trailing edge pole face with a shape that is a composite of a trapezoid, a first rectangle and a first triangle, wherein said first rectangle is disposed between and shares opposite sides with said trapezoid and said first triangle, wherein said trapezoid has a first parallel side adjacent to said gap, a second parallel side that is parallel to and longer than said first parallel side, and two non-parallel sides of substantially equal length;

wherein said leading edge pole has an ion milled leading edge pole face with a shape that is a composite of a second rectangle and a second triangle, wherein said second rectangle has a side adjacent to said gap and shares an opposite side with said second triangle, wherein said second rectangle also having a pair of outer edges;

b) placing said magnetic head adjacent to a track bearing surface of a magnetic disk such that a portion of a track will pass by said leading edge pole before passing by said trailing edge pole; and, c) inducing an alternating magnetic field to flow across said gap between said leading and trailing edge pole faces for writing data to a track of said magnetic disk such that said outer edges of said leading edge pole face become magnetically saturated to create said erase bands on said magnetic disk.

* * * * *